(12) United States Patent
Wang et al.

(10) Patent No.: US 7,361,939 B2
(45) Date of Patent: Apr. 22, 2008

(54) DRIVING CIRCUIT OF LCD PANEL

(75) Inventors: TongJung Wang, Tainan County (TW); ChinCheng Chien, Tainan County (TW); HungYi Tseng, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 296 days.

(21) Appl. No.: 11/159,167

(22) Filed: Jun. 23, 2005

(65) Prior Publication Data

US 2006/0012744 A1 Jan. 19, 2006

(30) Foreign Application Priority Data

Jul. 14, 2004 (TW) .............................. 93121017 A

(51) Int. Cl.
*H01L 29/22* (2006.01)
(52) U.S. Cl. ....................................................... 257/99
(58) Field of Classification Search ................... 257/99
See application file for complete search history.

(56) References Cited

U.S. PATENT DOCUMENTS 5,679,928 A * 10/1997 Okano et al. ................ 174/261
2003/0234760 A1* 12/2003 Lin et al. ...................... 345/98

FOREIGN PATENT DOCUMENTS

TW 00584828 4/2004

* cited by examiner

*Primary Examiner*—Mary Wilczewski
*Assistant Examiner*—Swapneel Chhaya

(57) ABSTRACT

A driving circuit of a liquid crystal display, having a plurality integrated circuit chips and a conductive line. The integrated circuit chips are electrically connected to each other via the conductive line, and the impedance between each integrated circuit chip and the conductive wire is different, thereby an input voltage for each integrated circuit chip is substantially the same.

20 Claims, 6 Drawing Sheets

DRIVING CIRCUIT OF LCD PANEL

BACKGROUND OF THE INVENTION

1. Field of Invention

The present invention relates in general to a driving circuit of a liquid crystal display, and more particular, to a driving circuit with chip-on-glass designed for use in a liquid crystal display.

2. Related Art

The liquid crystal displays, having the features of small volume, light weight, low driving voltage and low power consumption, have replaced the conventional cathode ray tubes applied to laptop computers, personal digital process systems and color television.

In a driving circuit of a typical liquid crystal display, multiple driving integrated circuit chips are packaged on one surface the corresponding tape carrier packages (TCP's). The TCP's are then electrically connected to the printed circuit board and the glass substrate of the liquid crystal display. In operation, control signals are transmitted from the printed circuit board to the integrated circuit chips of the TCP's. Being processed by the driving integrated circuit chips, driving signals are generated to the glass substrate.

However, as the material for forming the TCP's is very expensive, and tests for such package are relatively high, the package causes a great economic burden to the fabrication of liquid crystal display. Therefore, currently, the technique of chip on glass and wiring on glass (WOA) has been developed to construct the driving circuit of the liquid crystal display.

Referring to FIGS. 1 and 2, a top view of a liquid crystal display panel having the designs of chip on glass and wiring on array, and a local enlargement of FIG. 1 are illustrated, respectively. The liquid crystal display panel 100 includes the upper and lower glass substrates 102 and 104, and two sets of driving circuits. The first driving circuit includes a plurality of integrated circuit chips 106 packaged in the respective carriers 108 and electrically connected to the surface of the glass substrate 104. The second driving circuit is typically located at the side of the scanning circuit. The second driving circuit includes a plurality of integrated circuit chips 112a to 112c and a conductive wire 110. Each of the integrated circuit chips 112a to 112c has a plurality of solder pads. The conductive wire 110 is located on the glass substrate 104. The integrated circuit chips 112a to 112c are mounted on the conductive wire 110 on the glass substrate 104 via chip on glass technique. The conductive wire 110 serially connects the integrated circuit chips 112a to 112c and electrically connects to the integrated circuit chip 106 of the first driving circuit.

As the resistance of the conductive wire 110 is relatively high, different levels of voltage drops occur according to the length of the conductive wire when a driving voltage carried by the control signal is applied to the individual integrated circuit chips 112a to 112c via the integrated circuit chip 106, the carrier 108 and the conductive wire 110. As a result, the voltages applied to the integrated circuit chips 112a and 112c are uneven to affect the image quality.

SUMMARY OF THE INVENTION

The present invention is to provide a driving circuit of a liquid crystal display. By adjusting the total contact area of the contact window between the solder pad of each integrated circuit chip and the conductive wire, the voltage drop caused by different length of the conductive wire can be compensated. Thereby, the voltage applied to each integrated circuit is substantially the same. The image quality is thus enhanced.

Accordingly, the driving circuit includes a plurality integrated circuit chips, a conductive line and a plurality of resistance devices electrically connected the integrated circuit chips to the conductive wire. The numbers or dimensions of the resistance devices are adjusted to control an input voltage applied to each integrated circuit chip.

The driving circuit further includes a conductive layer and an insulation layer on the conductive wire and at least a part of the glass substrate. The resistance devices include a plurality of solder pads. The insulation layer includes a plurality of contact windows exposing the solder pads. The conductive layer is formed on the insulation layer and filling the contact windows. The conductive layer is in contact with the conductive film exposed by the contact windows. The liquid crystal display is a wiring-on-array liquid crystal display, and the driving circuit is used to drive a liquid crystal panel of the liquid crystal display. Moreover, the resistance between the integrated circuit chips and the conductive wire is larger than 20 Ohms when the conductive wire is made of a single metal layer. On the other hand, the resistance between the integrated circuit chips and the conductive wire is larger than 10 Ohms when the conductive wire is made of a double-layer metal structure.

Based on the uneven impedance between each integrated circuit chip and the conductive wire, an input voltage for each integrated circuit chip is substantially the same. Therefore, the image quality of the liquid crystal display is improved.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Please refer to FIG. 3 to FIG. 6. The present invention provides a driving circuit of a liquid crystal display to control the same input voltage applied to each solder pad of each integrated circuit chip.

Figure 1:
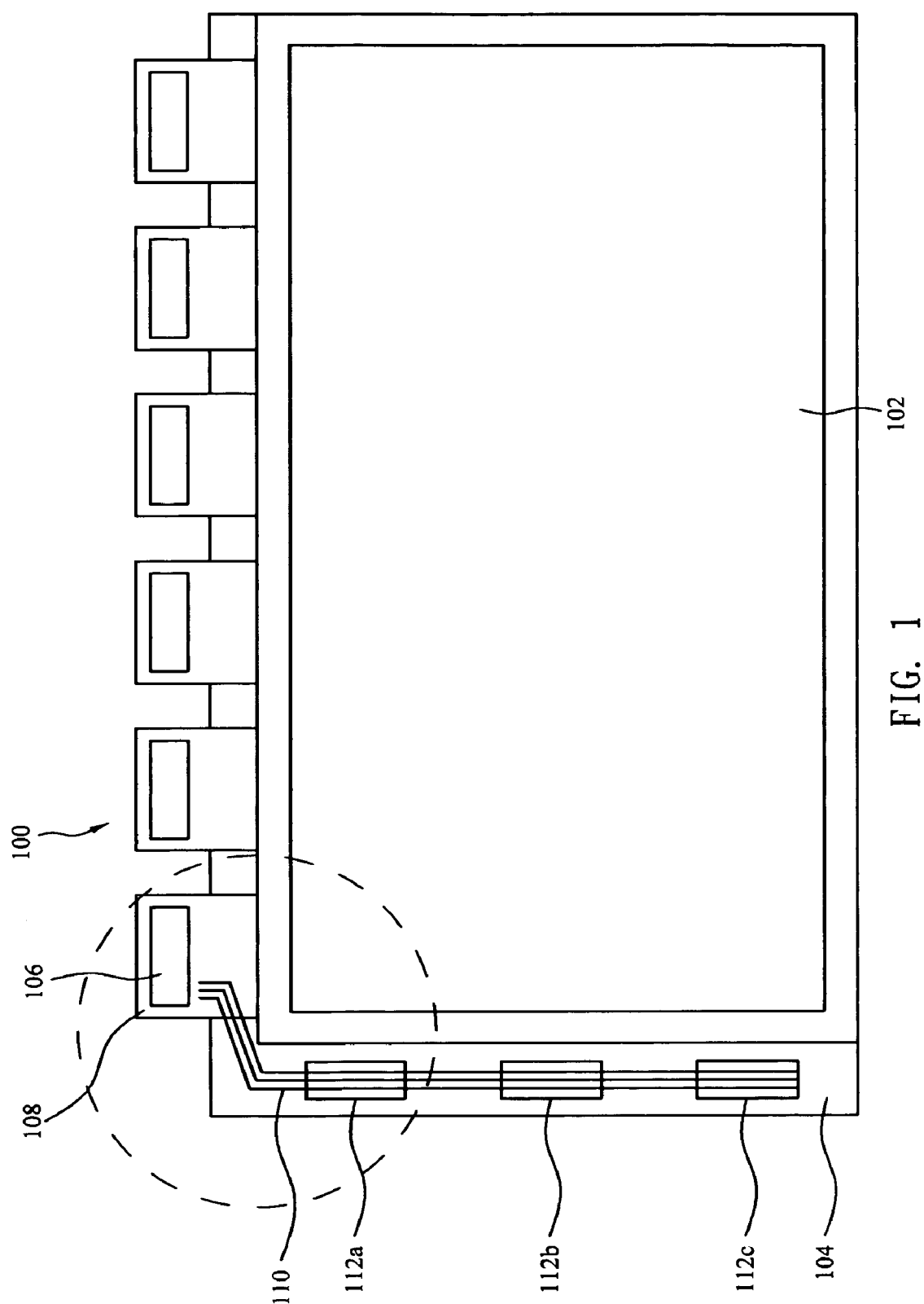
FIG. 1 shows a top view of a liquid crystal display panel having the designs of chip on glass and wiring formed on array.
Figure 3:
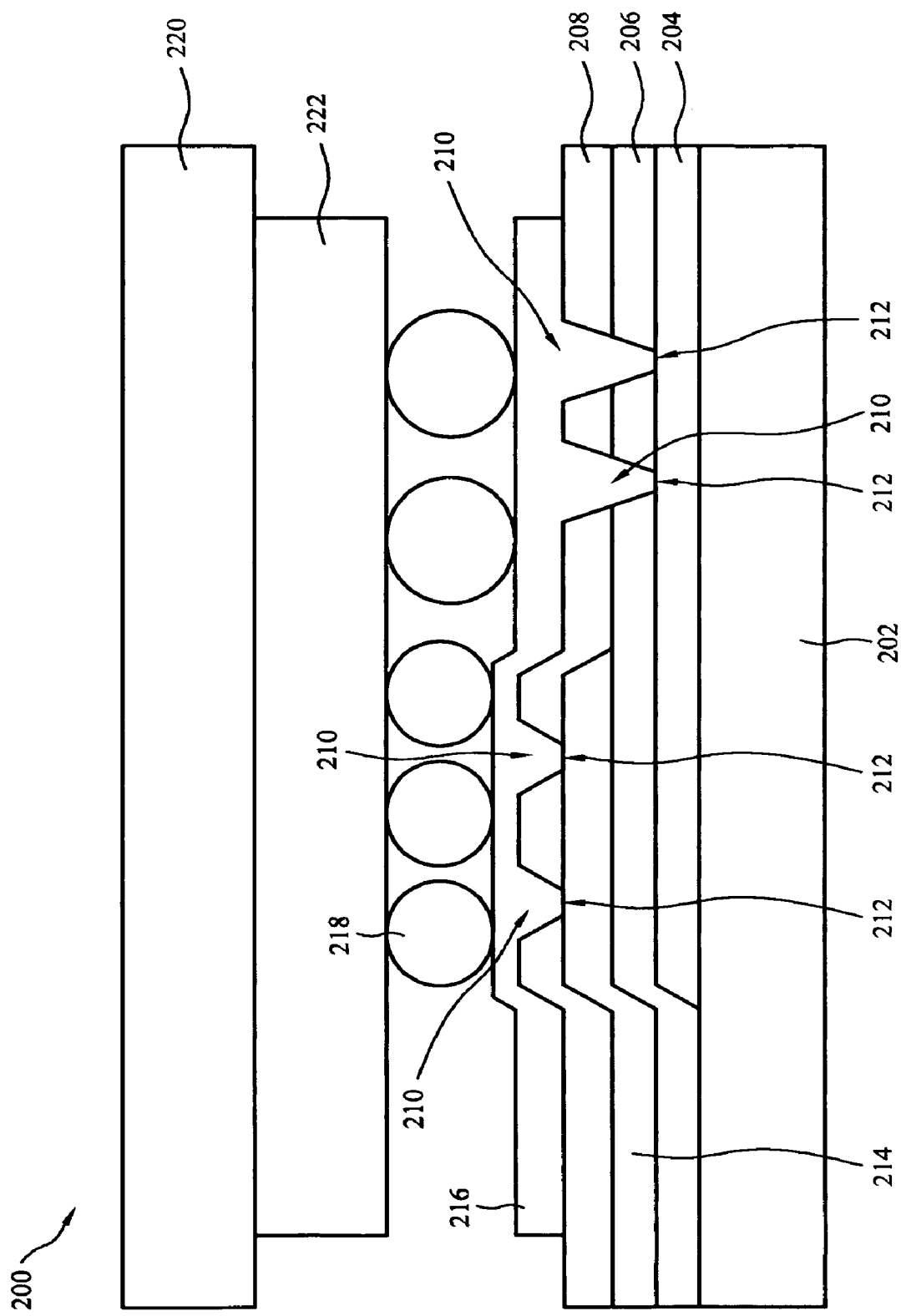
FIG. 3 is a cross sectional view showing a part of a driving circuit for a liquid crystal display.
Figure 4:
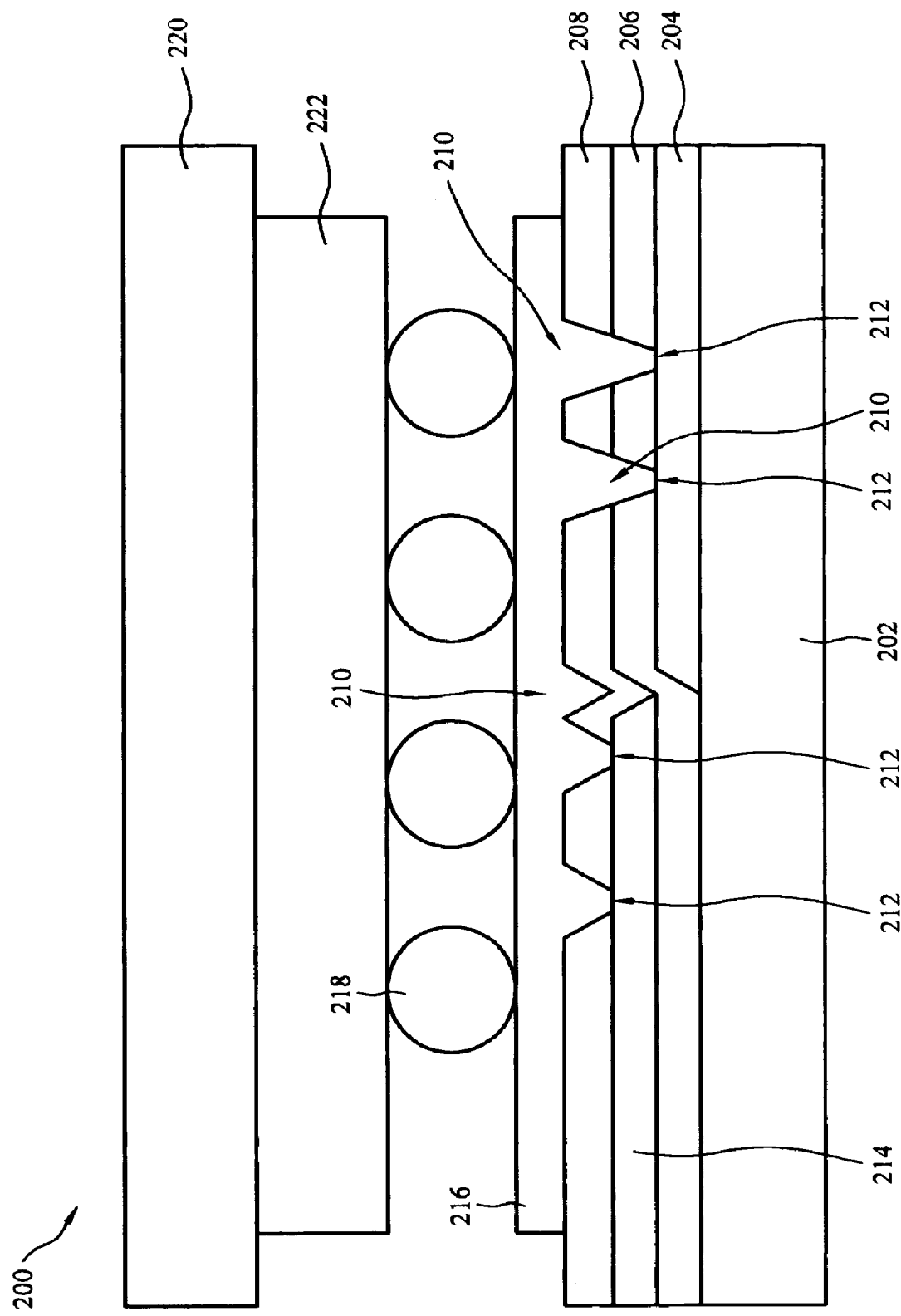
FIG. 4 shows the partial cross sectional view of a second embodiment of a liquid crystal display.
Figure 5:
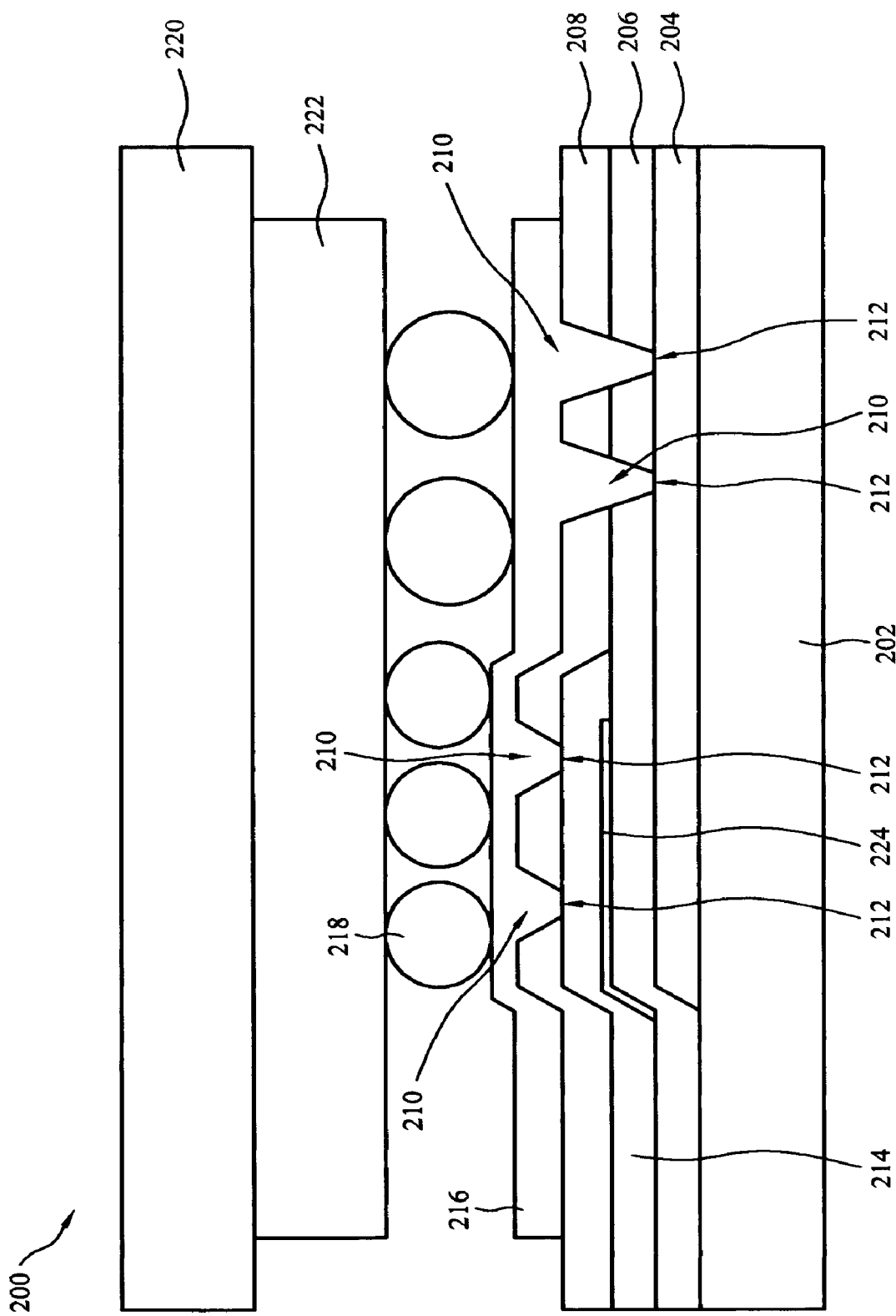
FIG. 5 shows the partial cross sectional view of a third embodiment of a liquid crystal display.
Figure 6:
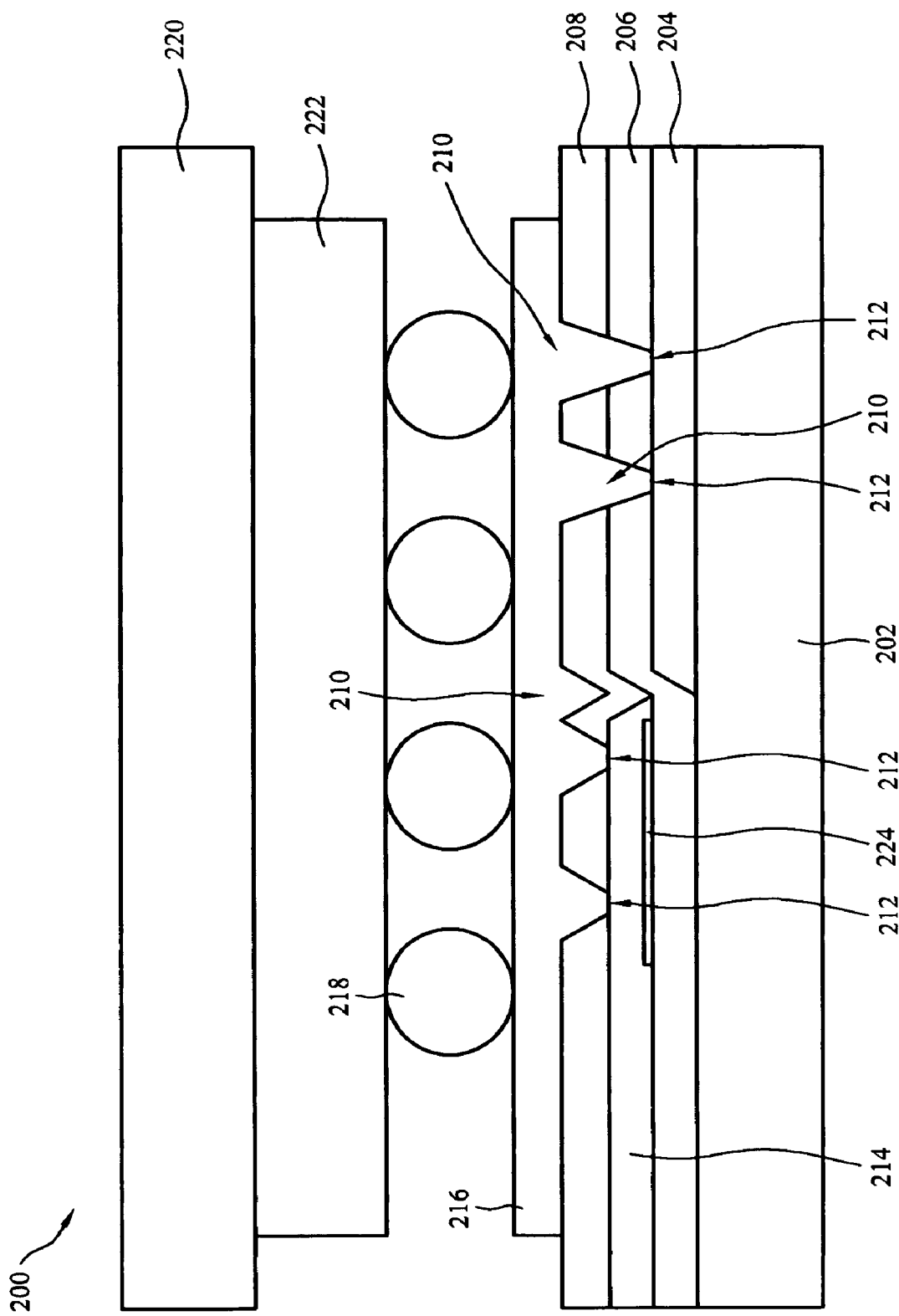
FIG. 6 shows the partial cross sectional view of a fourth embodiment of a liquid crystal display.

FIG. 3 shows a liquid crystal display having the design of chip on glass and wiring on array. As shown, the exterior structure of the liquid crystal display 200 is about the same as that as shown in FIG. 1. The liquid crystal display 200 includes a glass substrate 202 and a driving circuit formed on the glass substrate 202. The driving circuit includes a conductive wire and a plurality of integrated circuit chips 220 connected to the conductive wire by flip-chip technique. The metal layer 204 serving as the conductive wire is formed on a part of the glass substrate 202. An insulation layer 206 is formed on the other part of the glass substrate 202 and the metal layer 204. The material of the insulation layer 206 includes dielectric material such as silicon nitride. A metal layer 214 is formed on a part of the insulation layer 206. The metal layer 214 and the metal layer 204 are preferably formed from different materials. In this embodiment, the metal layer 214 is partially aligned over the metal layer 204 as shown in FIGS. 3 and 5. The metal layer 214 can also be misaligned over the metal layer 204 as shown in FIGS. 4 and 6. The metal layers 204 and 214 form the conductive wire of the driving circuit.

A protection layer 208 is formed on the metal layer and the exposed insulation layer 206. Exemplary material for the protection layer 208 includes silicon nitride, for example. A plurality of contact windows 210 is then formed in the projection layer 208 or the protection layer 208 and the insulation layer 206, so as to expose portions of the metal layers 204 and 214. A conductive layer 216 is then formed to fill the contact windows 210 and overflow to cover the protection layer 208. The metal layer 204 is thus electrically connected tot eh metal layer 214. The material of the conductive layer 216 includes indium tin oxide, for example. A conductive film 218 such as an anisotropic conductive film (ACF) is coated on the conductive layer 216. A plurality of integrated circuit chips 220 is the provided. The surface of each of the integrated circuit chips 220 includes at least one solder pad 222. Generally, each integrated circuit chip 220 includes a plurality of solder pads 222. Using flip-chip technique, the solder pads 222 and the integrated circuit chips 220 are electrically connected to the conductive film 218. The material of the solder pads 222 includes gold, for example. In this embodiment, each of the solder pads 222 is aligned over one respective contact window 210. Generally speaking, each solder pad 222 may correspond to a plurality of contact windows 210. The area of the metal layer 204 exposed by each contact window 210 can be substantially the same or different from the metal layer 204 exposed by the contact window 210.

Figure 2:
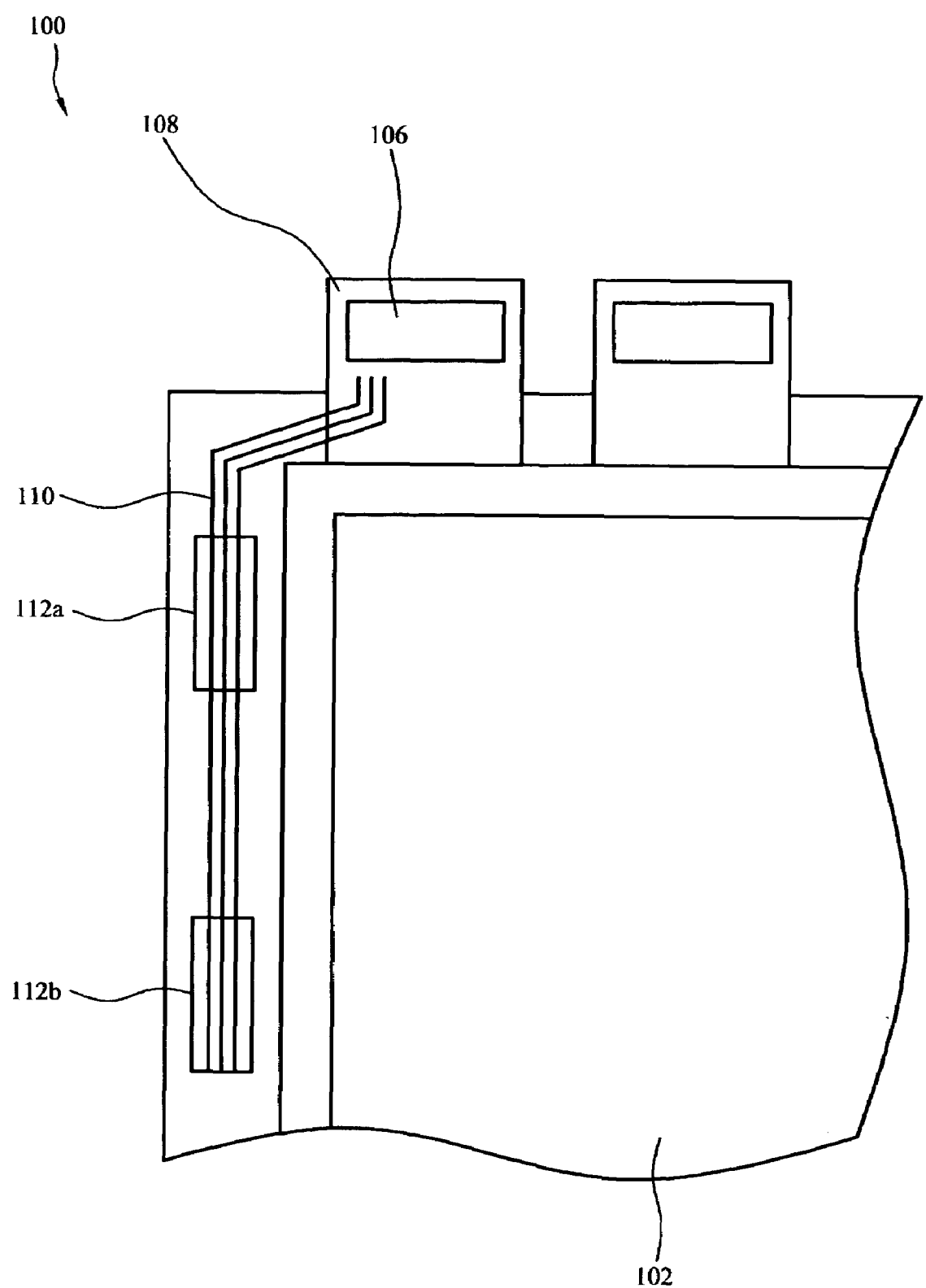
FIG. 2 is a local enlargement of FIG. 1.

As the resistance of the conductive wire formed of the metal layers 204 and 214 is significantly large, voltage drop occurs to each integrated circuit chip 220 according to the length of the metal layers 204 and 214 when the driving voltage carried by the control signal is applied to the integrated circuit chips 222 via the metal layers 204 and 214. As a result, the input voltage for each of the integrated circuits 220 is different. For example, as shown in FIG. 2, the control signal applied to the integrated circuit chip 112*a* only travels through the conductive wire between the integrated circuit chip 106 and the integrated circuit chip 112*a*. The control signal applied to the integrate circuit chip 112*b* propagates through the conductive wire between the integrated circuit chips 106 and 112*a*, the interior of the integrated circuit chip 112*a*, and the conductive wire 110 between the integrated chips 112*a* and 112*b*. Therefore, the voltage drop of the integrated circuit chip 112*a* caused by resistance is less than that of integrated circuit chip 112*b*. Therefore, the input voltage applied to the integrated circuit chip 112*a* is larger than that applied to the integrated circuit chip 112*b*.

Therefore, to resolve the above problem, the area of the window corresponding to each pad 222 for each integrated circuit chip 220 to exposes the metal layers 204 and 214 is different. Thereby, the total contact areas of between the conductive layer 210 and the metal layers 204 and 214 are different. As a result, the resistance of the conductive wire constructed by the metal layers 204 and 214 for each integrated circuit chip 220 is different, such that the different voltage caused by uneven length of the conductive wire is compensated. Consequently, the voltage applied to each integrated circuit chip 220 is substantially the same. For example, as shown in FIG. 1, as the original input voltage applied to the integrated circuit chip 112*a* is larger than that applied to the integrated circuit chip 112*b*, the contact window corresponding to each solder pad of the integrated circuit chip 112*b* can be designed with a larger area compared to the contact window corresponding to each solder pad of the integrated circuit chip 112*a*. Thereby, the voltage applied to each solder pad of the integrated circuit chips 112*a* and 112*b* through the conductive wire 110 is the same.

The area 212 of the metal layers 204 and 214 exposed by each contact window 210 can be substantially the same or different. The area of each solder pad 222 of each integrated circuit chip exposed by the corresponding window 210 can be adjusted the same or different. Further, the amount of contact windows for each solder pad can also be adjusted. Therefore, by adjusting the total areas of the exposed metal layers 204 and 214, the voltage applied to each integrated circuit chip can be adjusted substantially identical to each other.

It will be appreciated that an additional amorphous silicon material layer 224 can be introduced between the metal layer 214 and the insulation layer 206 to allow smooth deposition of the metal layer 214 as shown in FIGS. 5 and 6.

In the embodiment as described above, a two-layer metal structure is used to form the conductive wire. It will be appreciated that the conductive wire can also be made of a single-layer or multilayer metal structure. Preferably, the resistance of conductive wire between adjacent integrated circuit chips is larger than 20 Ohms when the conductive wire is made of a single metal layer. When the conductive wire is made of a double-layer metal structure, each of the metal layers has a resistance of about 10 Ohms.

Accordingly, by adjusting the amount or dimension of the contact windows between the integrated circuit chips and the conductive wires, the voltage drop across each integrated circuit chip can be properly controlled to result in substantially the same input voltage for each integrated circuit chip. As a result, the display quality of the liquid crystal display is enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A driving circuit of a liquid crystal display, comprising:
   a plurality of integrated circuit chips;
   a conductive wire; and
   a plurality of resistance devices electrically connected the integrated circuit chips to the conductive wire, wherein a total electrical contact area between each resistance device and the conductive wire for each integrated circuit chip is adjusted to result in a substantial identical input voltage applied to each integrated circuit chip.

2. The driving circuit of claim 1, further comprising a glass substrate for mounting the conductive wire thereon.

3. The driving circuit of claim 2, wherein each integrated circuit chip includes a plurality of solder pads for connecting to the conductive wire.

4. The driving circuit of claim 3, further comprising a conductive film electrically connecting the solder pads to the conductive wire.

5. The driving circuit of claim 4, wherein the conductive film includes an anisotropic conductive film.

6. The driving circuit of claim 4, wherein each of the resistance devices includes:
   an insulation layer on the conductive wire and at least a part of the glass substrate, wherein the insulation layer includes a plurality of contact windows, each solder pad corresponding to at least one of the contact windows; and
   a conductive layer formed on the insulation layer and filling the contact windows, the conductive layer being in contact with the conductive wire exposed by the contact windows.

7. The driving circuit of claim 6, wherein each solder pad of the integrated circuit chips comprises different amount of the contact windows.

8. The driving circuit of claim 6, wherein the total contact area between the conductive layer and the conductive wire is different for each integrated circuit chip.

9. The driving circuit of claim 6, wherein each of the resistance devices further comprising a protection layer formed on the insulation layer so as to protect the contact windows.

10. The driving circuit of claim 6, wherein the liquid crystal display includes a wiring-on-array liquid crystal display, and the driving circuit is used to drive a liquid crystal panel of the liquid crystal display.

11. The driving circuit of claim 1, wherein the conductive wire includes at least one metal layer.

12. The driving circuit of claim 11, wherein the resistance between the integrated circuit chips and the conductive wire is larger than 20 Ohms when the conductive wire is made of a single metal layer.

13. A liquid crystal display, comprising:
   a glass substrate;
   a conductive wire on the glass substrate;
   an insulation layer on the conductive wire, the insulation layer having a plurality of contact windows to expose the conductive wire;
   a conductive layer filling the contact windows to contact the conductive wire; and
   a plurality of integrated circuit chips disposed on the conductive layer, each of the integrated circuit chips having at least one solder pad corresponding to at least one of the contact windows, wherein the conductive wire exposed by the contact windows is adjustable so that a total contact area between the conductive layer and the conductive wire for each integrated circuit chip is different to result in a substantial identical input voltage applied to each integrated circuit chip.

14. The liquid crystal display of claim 13, further comprising a conductive film electrically connecting the solder pads to the conductive layer.

15. The liquid crystal display of claim 14, wherein the conductive film includes an anisotropic conductive film.

16. The liquid crystal display of claim 13, further comprising a protection layer formed on the insulation layer so as to protect the contact windows.

17. The liquid crystal display of claim 13, wherein the resistance between the integrated circuit chips and the conductive wire is larger than 20 Ohms when the conductive wire is made of a single metal layer.

18. A liquid crystal display, comprising at least:
   a glass substrate;
   a driving circuit located on the glass substrate for driving the liquid crystal display, comprising:
   a first metal layer located on a part of the glass substrate;
   a dielectric layer covering the first metal layer and another part of the glass substrate;
   a second metal layer formed on a part of the dielectric layer;
   a protective layer formed on the second metal layer and another part of the dielectric layer;
   a plurality of contact windows formed in the protection layer or the protection layer and the insulation layer, so as to expose portions of the first and the second metal layers;
   a conductive layer formed on the protective layer and filling the contact windows;
   a plurality of integrated circuit chips formed above the conductive layer, wherein each integrated circuit chip includes a plurality of solder pads each corresponding to at least one of the contact windows, wherein the amount of the solder pads for each integrated circuit chip is adjusted so that a total contact area between the conductive layer and a conductive wire including the first and the second metal layers for each integrated circuit chip is different to result in a substantially identical input voltage applied to each integrated circuit chip; and
   a conductive film for connecting the soldering pads to the conductive layer.

19. The liquid crystal display of claim 18, wherein the first metal and the second metal layers are made of different material.

20. The liquid crystal display of claim 18, wherein the resistance between the integrated circuit chips and the conductive wire is larger than 20 Ohms when the conductive wire is made of a single metal layer.

* * * * *